United States Patent Office 2,701,777
Patented Feb. 8, 1955

2,701,777

METHOD OF COATING GLASS FIBERS WITH AN ASPHALT EMULSION

Robert W. Farris, Newark, Ohio, assignor to Owens-Corning Fiberglas Corporation, a corporation of Delaware No Drawing. Application June 20, 1951,
Serial No. 232,677

5 Claims. (Cl. 117—126)

This invention relates to asphaltic emulsions and to articles prepared with same and it relates more particularly to asphaltic emulsions for use in combination with glass fibers in the manufacture of bonded mat which, when in position of use, may be further combined with the asphaltic emulsion in the fabrication of roofing, insulation, asphaltic shingles, pipe wrap and the like.

In the use of asphaltics as an impregnant or as a binder in the manufacture of structures with glass fibers it has been found more expedient, safer and more economical to make use of the asphaltic materials dispersed as fine particles or globules in aqueous emulsion than to employ solid solutions of the material. Rapid set has been found difficult to achieve with solvent solutions because of the normally slow evaporation rate of the solvent component and the solvent normally is not only highly combustible but expensive as well. It is also vastly better from the standpoint of fabricating technique to make use of such asphaltic emulsions rather than hot melts of the corresponding asphaltic material. Hot melts require the use of melting equipment and transporting equipment which cannot always be made readily available at stations of use and very often the melt is so viscous and of such character that satisfactory penetration of glass fiber fabrics or the like is not achieved and bonding with underlying layers to achieve suitable integration is usually insufficient. In order to achieve more satisfactory protection by application from hot melts, it has been the practice to apply the asphaltic materials in greater quantity than would ordinarily be necessary.

Unfortunately, the use of asphaltic emulsions in the fabrication of glass fiber structures has not been free of a number of difficulties. Glass fibers possess certain properties which tend to limit wetting out and inhibiting penetration of the asphaltic emulsion. Ordinarily when asphaltic emulsions are applied as an impregnant for glass fiber fabrics, the emulsion tends to film over the fabric instead of impregnating the fabric and foaming which is often encountered in the use of asphaltic emulsions renders penetration of the fabric still more difficult so that lack of bonding or anchorage to underlying coatings is experienced.

It is desirable to make use of an emulsion which in combination with a glass fiber fabric is able to set rapidly into a highly flexible, tack-free product so as to permit handling almost immediately after treatment. It is important in order to achieve satisfactory application, to make use of an asphaltic emulsion characterized by low viscosity and relatively high solids content but it is desirable to achieve reduction in viscosity without sacrifice of stability, shelf life or any of the other properties which provide for good penetration and rapid set of the asphaltic material to form a tack-free, flexible structure. When in position of use, it is important that the asphaltic material deposited from emulsion have good resistance to deterioration, hardening or cracking under all weather conditions to which it might be exposed and that it be highly resistant to oxidation.

It has been difficult to formulate an asphaltic emulsion which is able to supply all or most of the desirable characteristics described. In an effort to incorporate these properties in an asphaltic emulsion used in combination with glass fiber materials, a wide variety of chemical compounds in the form of wetting agents, surface tension modifying agents, stabilizers and emulsifying agents have been formulated into various asphaltic emulsions. A limited number of chemical compounds were able to reduce viscosity of asphaltic emulsions. This is especially true of most metal salts of petroleum sulfonic acid, metal salts of fatty acid sulfonates, or fatty acid amides and the like. Compounds having the ability to reduce viscosity failed to embody one or more of the properties for increasing penetration, great decrease of thixotropic effect and ability to set rapidly into a flexible, tack-free film having good weathering characteristics. For example, polyoxyethylene derivatives such as sorbitan monolaurate polyoxyethylene, sorbitan monostearate polyoxyethylene, or sorbitan monopalmitate polyoxyethylene, or the like, or sodium salts of sulfonated fatty alcohols, alkyl aryl sodium sulfonates and the like are able to lower viscosity but fail in one or more of the other characteristics, such as weathering, penetrability, film strength, thixotropic effect, foaming, or the like.

It is an object of this invention to produce an asphalt in water emulsion which is not subject to the limitations described and it is a related object to produce improved glass fiber-asphaltic structural products making use of same.

It has been found that when the asphalt in water emulsion is formulated according to this invention the viscosity of asphalt in water emulsions is markedly lowered without decreasing the solids content or introducing a thixotropic effect; the ability of the emulsion rapidly to wet out the surfaces of glass fibers so as to increase the penetrability of a glass fiber fabric is greatly increased; and the asphaltic component quickly sets into a hghly flexible, tack-free condition having good weathering and oxidation resistance. This is accomplished by formulating the emulsion with a small amount of anionic compound in the form of a fatty acid ester or mixed fatty acid esters of polyethylene glycol, such as the stearic acid ester of triethylene glycol, the palmitic acid ester of diethylene glycol and the oleic acid ester of triethylene glycol, castor oil fatty acids of triethylene glycol, palm oil fatty acid esters of diethylene glycol and the like.

The amount of anionic compound effective for achieving the desired results in the asphalt in water emulsion ranges from 0.05–4.0 percent by weight based on the amount of the asphaltic emulsion. More than 4.0 percent by weight of the additive can be used by corresponding reduction in viscosity is not achieved and weathering characteristics are not improved. The preferred amount of anionic compound in the asphaltic emulsion ranges from 0.5–3.0 percent by weight. Since the additive is soluble in water in substantially all proportions, it is convenient to prepare a stock solution of the fatty acid ester of polyethylene glycol in high concentration and incorporate the desired amount of the solution in the asphaltic emulsion, with or without further dilution with water to predetermined asphaltic content.

For the preparation of bonded mat, use may be made of an asphaltic emulsion having an asphalt content ranging from 1–17 percent by weight but it is preferred to make use of a composition containing 5–15 percent by weight of the asphaltic component. For impregnation of mat, preferably bonded with asphaltic material deposited from an emulsion embodying features of this invention, as in the manufacture of roof mat, asphaltic shingles, roofing or the like, use may be made of an emulsion having an asphaltic content ranging from 30–60 percent by weight but it is preferred to make use of an emulsion having 35–50 percent asphalt. Even though the fatty acid ester of polyethylene glycol may be present in optimum amounts, it has been found that instability results when the asphaltic emulsion contains more than 60 percent by weight asphalt. It is preferred to make use of an asphaltic emulsion containing less than 60 percent of the asphaltic component and particular benefit results when the asphaltic emulsion also contains from 1–10 percent by weight finely divided clay, such as bentonite or other dispersing agent.

Application of this asphaltic emulsion in the manufacture of bonded glass fiber mat may be achieved by way of a flow coating process in which a constant stream of the emulsion is poured over the glass fiber mat after it is formed and excess removed by gravitational flow or by a squeeze process. In the event that the mat is self-sufficient, application of the emulsion may be effected by way of a dip squeeze process or the like. Treatment to deposit about 30 percent by weight asphalt in the bonded mat is sufficient but the amount of asphalt therein may vary from 20–50 percent by weight.

After application of the emulsion to the glass fibers in fabric form, rapid set to conditions for handling is enhanced by heat treatment at temperatures ranging from 250–850° F. upon exposure for 2–10 minutes. Heat treatment of the type described should preferably be carried out in an air circulating oven to achieve more rapid removal of the aqueous diluent. The mat, when cooled, can be handled with little difficulty. It will be understood that setting of the cement to condition for handling may be achieved at room temperature without the use of heat treatment or the like.

Certain tests have been devised to determine the ability of the asphaltic emulsion to impart the characteristics described in the manufacture of bonded mat or as the coating or impregnating composition for the manufacture of roofing, asphaltic shingles, pipe wrap or the like. These tests, described hereafter, have been used to compare asphaltic emulsions embodying features of this invention with emulsions formulated with other additives. Compounds which are non-ionic in character have been completely eliminated from consideration because of their inability to reduce viscosity of the water in oil emulsion. Comparison of anionic compounds each of which is able to give some reduction in viscosity has been made using an asphaltic emulsion containing 53 percent by weight asphalt with 3 percent by weight clay.

The following tests were made for purposes of comparing the ability of each of the emulsions to function in the manner intended:

1. *Amount of additive*

Determination was made of the amount of surface active agent required to reach minimum viscosity.

2. *Thixotropic effect*

After the emulsion had the optimum amount of surface active agent or additive incorporated, the emulsion was allowed to stand for one hour after which it was checked to determine whether any thickening or jelling had taken place.

3. *Penetration*

A bonded mat of glass fibers ordinarily used for roofing was positioned over a clean sheet of kraft paper and asphaltic emulsion added dropwise from a height of about 8 inches. The material was allowed to stand for 30 minutes and then the mat removed to observe whether or not penetration had taken place and the amount thereof.

4. *Film test*

Films formed of each of the emulsions were spread upon a paper and allowed to dry overnight. Measurements were made to determine the amount of pitting, scum formation and the extent of through drying relative to thickness.

5. *Foaming*

Foam presents a problem because the presence thereof renders proper penetration of the glass fiber fabric more difficult. Each emulsion was observed to determine the amount of foam formed.

It will be observed from the table that an emulsion embodying up to 3 percent by weight of the fatty acid ester of a polyethylene glycol formulated of mixed fatty acids is characterized by excellent reduction in viscosity without reduction in solids content, excellent penetration of the glass fiber fabric, no thixotropic effect, good mat penetration and highly desirable film characteristics, whereas other anionic compounds fail in one or more of the properties desired.

By way of illustration of uses which may be made of asphaltic emulsions embodying features of this invention, reference will be made to the manufacture of roofing.

In the present practice for the manufacture of roofing, a layer of asphalt in molten condition is spread as a base cover over the surface to be covered. One or more glass fiber bonded mats, preferably in the form of continuous webs, are laid on top and then one or more layers of asphalt in molten condition are webbed over the surface for the purpose of building up a relatively thick layer of asphalt which is reinforced and bonded to the base. It is desirable to have the various layers integrated into a substantially void-free, composite structure for the purpose of enhancing weather resistance and serviceability. To accomplish this end, it is important for the asphaltic material applied as the top coat easily and quickly to penetrate the mat, otherwise the voids will not be filled and anchorage between the top and base coats will not be complete.

Attempts to substitute aqueous emulsions of asphalts for hot melt in the manufacture of roofing have met with failure because of the tendency for the asphaltic emulsion to film over and not penetrate the glass fiber mat and the inability to achieve rapid set for drying. Many asphaltic emulsions foamed badly and rendered penetration even more difficult and this lack of penetration and lack of ability for rapid set coupled with the presence of the additive led to poor weathering properties. When asphaltic emulsions prepared in accordance with this invention are used in the manufacture of roofing, the above mentioned difficulties appear to be completely overcome. Penetration of the emulsion through the glass fiber mat and excellent bond to the undercoat is achieved and the asphalt component sets rapidly to form a uniform, weather resistant, composite layer having good wearing properties. The stability of the emulsion permits the emulsion to be piped over relatively long distances and to be processed through normal fluid handling equipment to make it more readily available for applications where otherwise such usage might be faced with difficulties with respect to labor and equipment.

It will be understood that the asphaltic emulsion embodying features of this invention may be used in the treatment of other fibrous materials or siliceous aggregates and that the term "asphalt," as used herein and in the claims, includes natural asphalt, blown asphalt, petroleum asphalt and the like.

It will be further understood that numerous changes may be made in the details of composition and use without departing from the spirit of the invention, especially as defined in the following claims.

I claim:

1. In the method of producing an asphalt impregnated glass fiber structure, the step of wetting a porous mat of glass fibers with an emulsion of asphalt in aqueous medium containing 0.05–4.0 percent by weight of a fatty acid ester of polyethylene glycol in which the fatty acid group contains about 18 carbon atoms to reduce foaming

*Comparisons of asphaltic emulsions for treatment with glass fiber fabrics*

| Additive | Percent Additive to Minimum Viscosity | Decrease in Viscosity | Thixotropic effect | Mat Penetration | Film Test |
| --- | --- | --- | --- | --- | --- |
| 1. Fatty acid ester of polyethylene glycol. | 3.0 | Good | None | Good | Good. |
| 2. Polyhydric alcohol ester of high molecular weight mineral organic acids. | 2.5 | Fair | Great | Poor | Poor. |
| 3. Polyoxyethylene | 5.0 | do | do | Fair | Do. |
| 4. Sorbitan monolaurate | 2.5 | do | None | Poor | Do. |
| 5. Sulfonated mineral oil | 1.75 | Good | Great | do | Fair. |
| 6. Sodium salt of sulfonated fatty alcohol. | 1.0 | Fair | Slight | do | Do. | and viscosity of the emulsion with minimum thixotropic effect and to increase the penetration of the asphaltic emulsion through the glass fiber mat and to improve the film characteristics of the asphaltic layer which is deposited.

2. The method of producing an asphalt impregnated glass fiber structure as claimed in claim 1 in which the amount of asphalt in the emulsion is within the range of 1-17 percent by weight for bonding the glass fibers in the mat.

3. The method of manufacturing an asphalt impregnated glass fiber structure as claimed in claim 1 in which the amount of asphalt in the emulsion is within the range of 30-50 percent by weight substantially completely to impregnate the glass fiber structure.

4. The method of manufacturing an asphalt impregnated glass fiber structure as claimed in claim 1 in which the asphaltic emulsion contains in addition 1-5 percent by weight of clay in finely divided form.

5. The method as claimed in claim 1 which includes the adidtional step of heating the impregnated mat at a temperature within a range of 250-850° F. for from 2-20 minutes to drive off the water and set the asphalt on the glass fiber surfaces.

References Cited in the file of this patent

UNITED STATES PATENTS

| | | |
|---|---|---|
| 1,914,100 | Bennett | June 13, 1933 |
| 2,207,256 | Knapp | July 9, 1940 |
| 2,503,246 | Craig | Apr. 11, 1950 |
| 2,552,900 | McCoy | May 15, 1951 |